J. ZIMMERMAN.
Combined Drier and Bake Oven.
No. 163,564. Patented May 18, 1875.
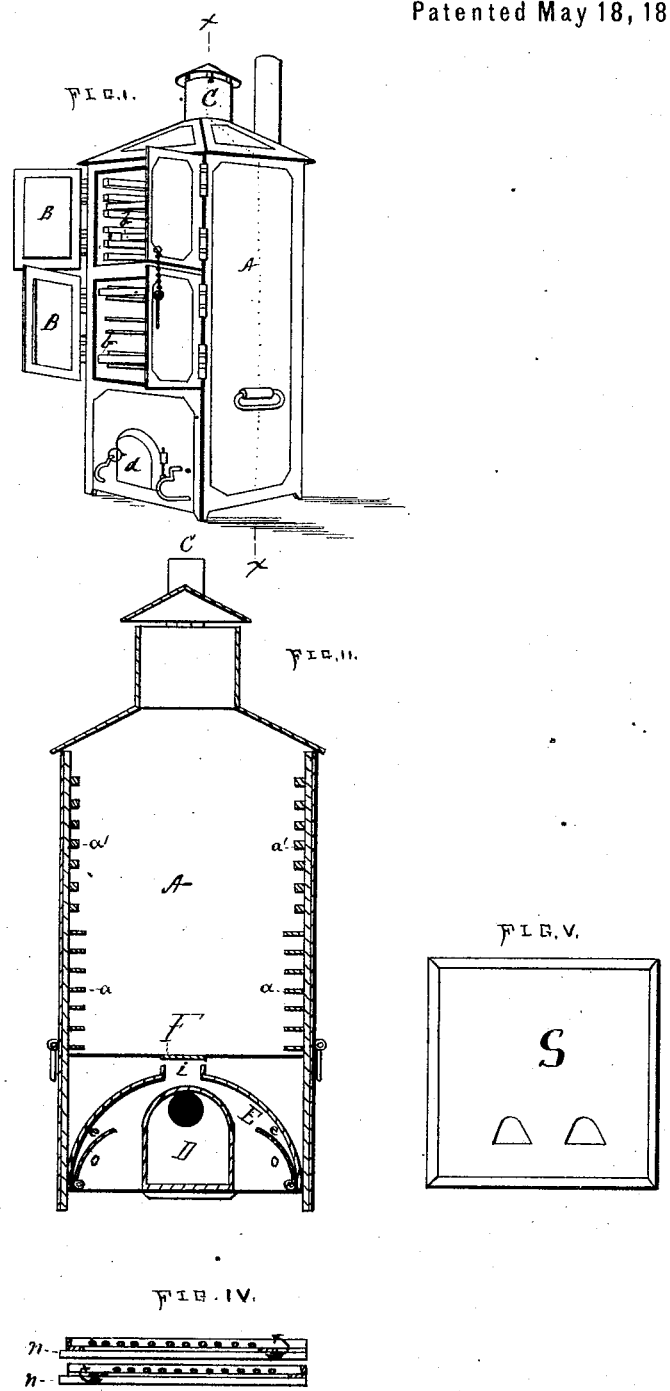

UNITED STATES PATENT OFFICE.

JOHN ZIMMERMAN, OF MANSFIELD, OHIO.

IMPROVEMENT IN COMBINED DRIERS AND BAKE-OVENS.

Specification forming part of Letters Patent No. 163,564, dated May 18, 1875; application filed January 14, 1875.

*To all whom it may concern:*

Be it known that I, JOHN ZIMMERMAN, of Mansfield, in the county of Richland and State of Ohio, have invented a new and Improved Fruit and Vegetable Drier and Bake-Oven combined; and I hereby declare the following to be a full, clear, and exact description thereof, reference being had to the accompanying drawing making a part of this specification, in which—

Figure 1 is a perspective view of my invention with the doors opened. Fig. 2 is a cross-section on the line $x \, x$ of Fig. 1. Figs. 3, 4, and 5, are details to be referred to.

The object of my invention is to provide a combined drier and bake-oven, which will have a furnace so constructed that there shall be no sharp corners to pass, nor any eddies formed in the current of air as it passes over the heated surface toward the drying and baking chamber. My invention also consists in the location of a spreader or heat-distributer over the opening for the ingress of the heated air. My invention further consists in sundry details of improvement hereinafter more fully described.

In order that those skilled in the art may make and use my invention, I will proceed to describe the manner in which I have carried it out.

In the said drawings, A is a properly-formed casing, having doors B and a central opening, C, at the top. In the bottom of the casing is located a furnace, D, having its cross-section the form of a semi-ellipse cut, at the shortest diameter making the bottom. This furnace is furnished with a door, $d$, and all other necessary appliances. The bottom of the casing forms a hood, E, over the furnace D, its sides being almost in planes parallel with the sides and top of the furnace, but flaring somewhat toward the bottom, as seen at $e$. The hood has a longitudinal opening, $i$, at its apex, through which the heated air, after passing over the sides of the furnace, passes into the casing. A short distance above this opening I locate a plate, F, which acts as a spreader or distributer of the current of heated air toward the sides of the casing, and prevents its immediate passage through the opening $c$. Along the sides of the casing are shoulders $a \, a'$, so arranged that trays $b \, b$, will slide into the casing and rest upon them, in order to hold vegetables or fruits to be dried. These trays $b \, b$ are constructed as shown in Fig. 3. The bars in each tray or rack are discontinued a short distance from the ends of the side pieces, so as to leave a small portion free from the article to be dried. The trays $n \, n$ are arranged as shown in Fig. 4, with the ends alternating so that there will be a draft of heated air in the line indicated by the arrows. Two dampers, $o \, o$, between the furnace-case and the hood E, serve to control the supply of air fed into the casing. When it is desired to convert the drier into an oven, I take a peculiarly-constructed slide, S, (see Fig. 5,) and pass it in upon two of the lower ledges $a' \, a'$, so as to contract the space to be heated, close the dampers $o \, o$, and anything can be baked or roasted upon the lowest racks. The slides I make of some close grained wood, as a good non-conductor of heat, and sheath it with sheet metal on one side, as shown.

Having thus described my invention, what I claim as new, and desire to secure by Letters Patent, is—

1. In combination with the furnace D and hood E, the dampers $o \, o$, as and for the purpose set forth.

2. The casing A and furnace D, in combination with the diaphragm S, said diaphragm being constructed of wood, with a sheet-metal sheathing, as described, and for the purpose set forth.

JNO. ZIMMERMAN.

Witnesses:
H. K. PARSONS,
R. B. McCRARY.